United States Patent
Astigarraga et al.

(10) Patent No.: US 10,529,194 B2
(45) Date of Patent: *Jan. 7, 2020

(54) END USER PROTECTION AGAINST ATM KEYPAD OVERLAY

(71) Applicant: International Business Machines Corporation, Armonk, NY (US)

(72) Inventors: Tara Astigarraga, Fairport, NY (US); Christopher V. DeRobertis, Hopewell Junction, NY (US); Louie A. Dickens, Tucson, AZ (US); Donald G. Grice, New Paltz, NY (US); Jose R. Mosqueda Mejia, Michoacan (MX); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/800,183

(22) Filed: Nov. 1, 2017

(65) Prior Publication Data

US 2019/0026997 A1    Jan. 24, 2019

Related U.S. Application Data

(63) Continuation of application No. 15/652,404, filed on Jul. 18, 2017.

(51) Int. Cl.
*G06F 21/82*    (2013.01)
*G07F 19/00*    (2006.01)

(52) U.S. Cl.
CPC .......... *G07F 19/2055* (2013.01); *G06F 21/82* (2013.01)

(58) Field of Classification Search
None
See application file for complete search history.

(56) References Cited

U.S. PATENT DOCUMENTS

2006/0000886 A1*    1/2006    Clark .................. G07F 19/20
                                                                250/208.1
2012/0038772 A1*    2/2012    Priesterjahn .......... G07F 19/207
                                                                348/150

(Continued)

FOREIGN PATENT DOCUMENTS

WO    2015147664 A1    10/2015

OTHER PUBLICATIONS

Astigarraga et al., "End User Protection Against ATM Keypad Overlap", U.S. Appl. No. 15/652,404, filed Jul. 18, 2017.

(Continued)

*Primary Examiner* — William J. Goodchild
(74) *Attorney, Agent, or Firm* — Cantor Colburn LLP; Teddi Maranzano (57) ABSTRACT

Methods, systems, and computer program products for data entry device security are provided. Aspects include receiving an indication of a user presence at a data entry device, wherein the data entry device includes a surface with apertures, and wherein the apertures include a material with a reflection coefficient. A presence of a fraud device is determined by emitting, from beneath the surface, security light from a set of one or more emitters, wherein the security light has a security light luminous power. A reflection of the security light off the material is collected by a first set of one or more sensors, wherein the reflection has a reflection luminous power. A luminous power range is determined based on the security light luminous power and the reflection coefficient and based on the reflection luminous power being outside the luminous power range, security measures are engaged at the data entry device.

10 Claims, 8 Drawing Sheets

(56) References Cited

U.S. PATENT DOCUMENTS

2015/0091547 A1* 4/2015 Vasilev .............. G07F 19/2055
324/76.45
2015/0213427 A1* 7/2015 Hodges .............. G07F 19/2055
705/18

OTHER PUBLICATIONS

List of IBM Patents or Patent Applications Treated as Related; (Appendix P), filed Nov. 1, 2017; 2 pages.
Adepoju, et al., "Challenges of Automated Teller Machine (ATM) Usage and Fraud Occurrences in Nigeria-A Case Study of Selected Banks in Minna Metropolis," Article Journal of Internet Banking and Commerce, Sep. 2010, https://www.researchgate.net/publication/228464353, pp. 1-11.
Authors et. al.: Disclosed Anonymously, "RFID authentication for ATM transactions," IPCOM000179641D, Feb. 19, 2009 pp. 1-2.
Authors et. al.: Disclosed Anonymously, "System & Method for ATM to Authenticate & Authorize Mobile Application," IPCOM000244875D, Jan. 25, 2016, pp. 1-6.
List of IBM Patents or Patent Applications Treated as Related; (Appendix P), filed Jul. 30, 2019; 2 pages.
Sankhwar et al., "A Safeguard against ATM Fraud," Advanced Computing (IACC), 2016 IEEE 6th International conference, (2016), pp. 701-705.
Astigarraga et al., "End User Protection Against ATM Keypad Overlay", U.S. Appl. No. 16/525,794, filed Jul. 30, 2019.

* cited by examiner

END USER PROTECTION AGAINST ATM KEYPAD OVERLAY

DOMESTIC PRIORITY

The present application claims priority to U.S. Non-provisional application Ser. No. 15/652,404 filed on Jul. 18, 2017, titled "END USER PROTECTION AGAINST ATM KEYPAD OVERLAY", assigned to the assignee hereof and expressly incorporated by reference herein.

BACKGROUND

The present invention generally relates to automated teller machines (ATM) end user protection, and more specifically, to end user protection against ATM keypad overlay with a device for fraud.

Automated teller machine (ATM) skimming is the process of stealing debit card information (e.g., PIN numbers) utilizing electronic reading devices covertly affixed to ATMs. One example is the usage of a keypad overlay device that rests on top of the ATM keypad. This overlay device can record the input of numbers such as an ATM user's personal identification number or PIN. Once a PIN is obtained from a victim, a scammer can utilize this information to obtain unauthorized cash from the victim's account.

SUMMARY

Embodiments of the present invention are directed to a computer-implemented method for data entry security. A non-limiting example of the computer-implemented method includes receiving, by a processor, an indication of a presence of a user at a data entry device, wherein the data entry device includes a surface with one or more apertures, and wherein the one or more apertures include a material with a reflection coefficient. A presence of a fraud device is determined by emitting, from beneath the surface, security light from a set of one or more emitters, wherein the security light has a security light luminous power. A reflection of the security light off the material is collected by a first set of one or more sensors, wherein the reflection has a reflection luminous power. A luminous power range is determined based on the security light luminous power and the reflection coefficient and based at least in part on the reflection luminous power being outside the luminous power range, one or more security measures are engaged at the data entry device.

Embodiments of the present invention are directed to a system for data entry security. A non-limiting example of the system includes receiving, by a processor, an indication of a presence of a user at a data entry device, wherein the data entry device includes a surface with one or more apertures, and wherein the one or more apertures include a material with a reflection coefficient. A presence of a fraud device is determined by emitting, from beneath the surface, security light from a set of one or more emitters, wherein the security light has a security light luminous power. A reflection of the security light off the material is collected by a first set of one or more sensors, wherein the reflection has a reflection luminous power. A luminous power range is determined based on the security light luminous power and the reflection coefficient and based at least in part on the reflection luminous power being outside the luminous power range, one or more security measures are engaged at the data entry device.

Embodiments of the invention are directed to a computer program product for data entry security, the computer program product comprising a computer readable storage medium having program instructions embodied therewith. The program instructions are executable by a processor to cause the processor to perform a method. A non-limiting example of the method includes receiving, by a processor, an indication of a presence of a user at a data entry device, wherein the data entry device includes a surface with one or more apertures, and wherein the one or more apertures include a material with a reflection coefficient. A presence of a fraud device is determined by emitting, from beneath the surface, security light from a set of one or more emitters, wherein the security light has a security light luminous power. A reflection of the security light off the material is collected by a first set of one or more sensors, wherein the reflection has a reflection luminous power. A luminous power range is determined based on the security light luminous power and the reflection coefficient and based at least in part on the reflection luminous power being outside the luminous power range, one or more security measures are engaged at the data entry device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
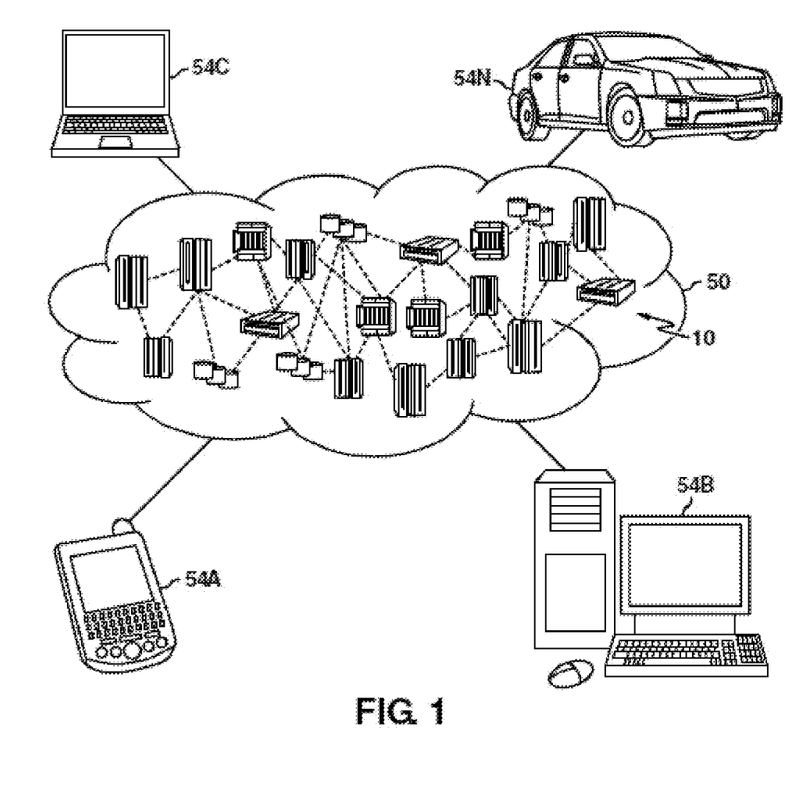
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
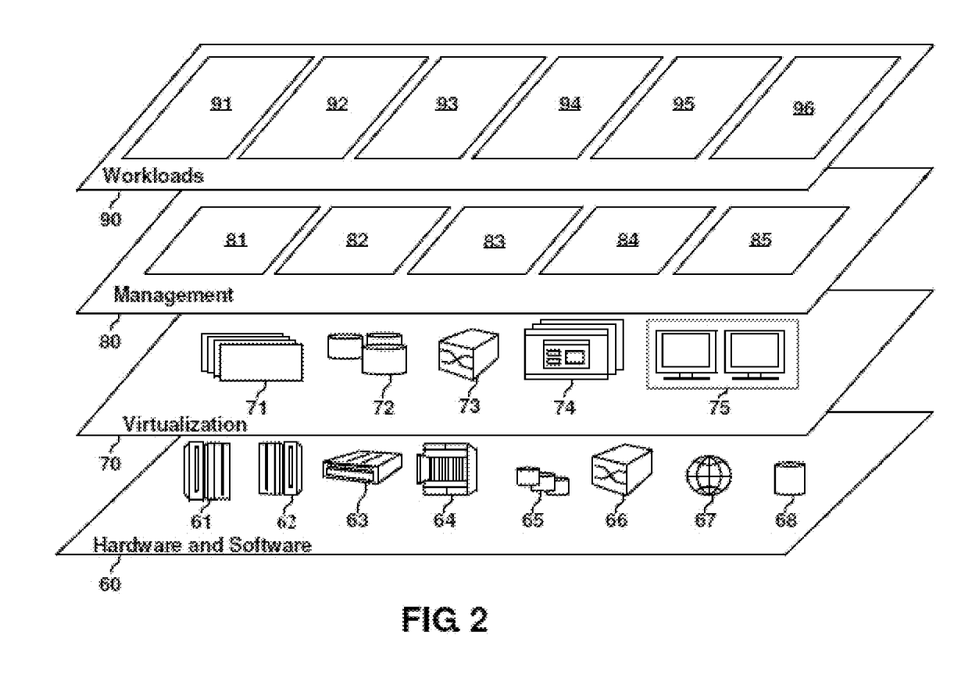
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and keypad security 96.

Figure 3:
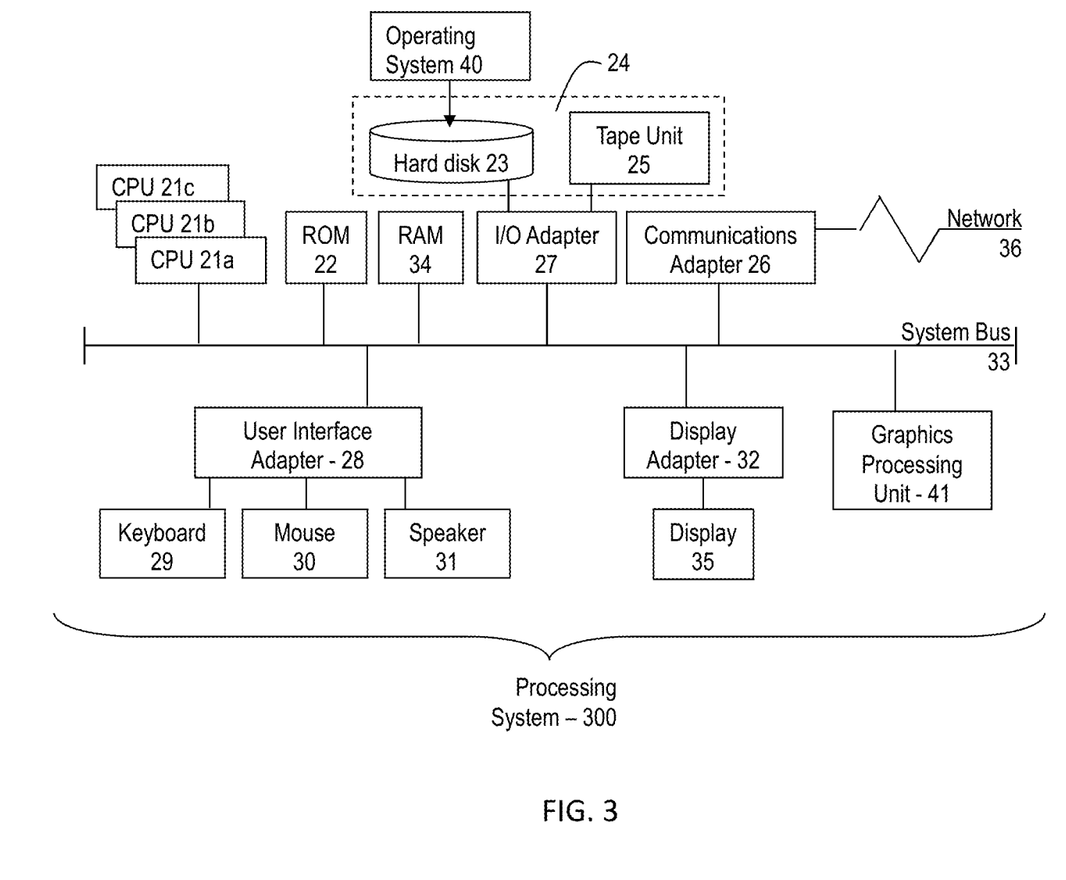
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, ATM kiosks are a prime target for scammers due to the presence of large amounts of cash. These scammers utilize various techniques to gain access to an ATM user's personal information such as a personal identification number (PIN). Some scammers will overlay a device over the data entry device (or keypad) of an ATM to collect this information from a user without the user's knowledge. In an effort to combat this type of ATM fraud, ATM keypads can be equipped to detect the heat from a human finger. However, this approach is unhelpful when receiving keypad inputs from an individual with a prosthetic hand or fingers. Additionally, individuals wearing gloves would be unable to utilize the keypad when direct-heat technologies are being used to combat ATM skimming. One approach is to utilize light emitted from the keypad to determine if a fraud device is overlaid onto the keypad. However, fraud devices have evolved to allow light to pass through the fraud device and allow for the collection of unauthorized financial information of a user of an ATM.

Turning now to an overview of the aspects of the invention, one or more embodiments of the invention address the above-described shortcomings of the prior art by providing methods, systems, and computer program products to protect an end user from keypad overlay devices. Existing solutions do not provide for detection of overlaid fraud devices on keypads. Sensors and emitters can be installed at a keypad for an ATM to emit and collect light to determine if a fraud device exists at the ATM. The keypad is arranged with multiple apertures with a translucent material within each aperture. When no fraud device is present, light is emitted from the emitters below the keypad and reflects back a portion of the emitted light. If the reflected portion of the light is within an allowable range, normal operation of the keypad can resume. However, if a fraud device is overlaid on the keypad, the total reflected light will increase causing security procedures to be enacted at the keypad including but not limited to disabling the keypad.

Figure 4:
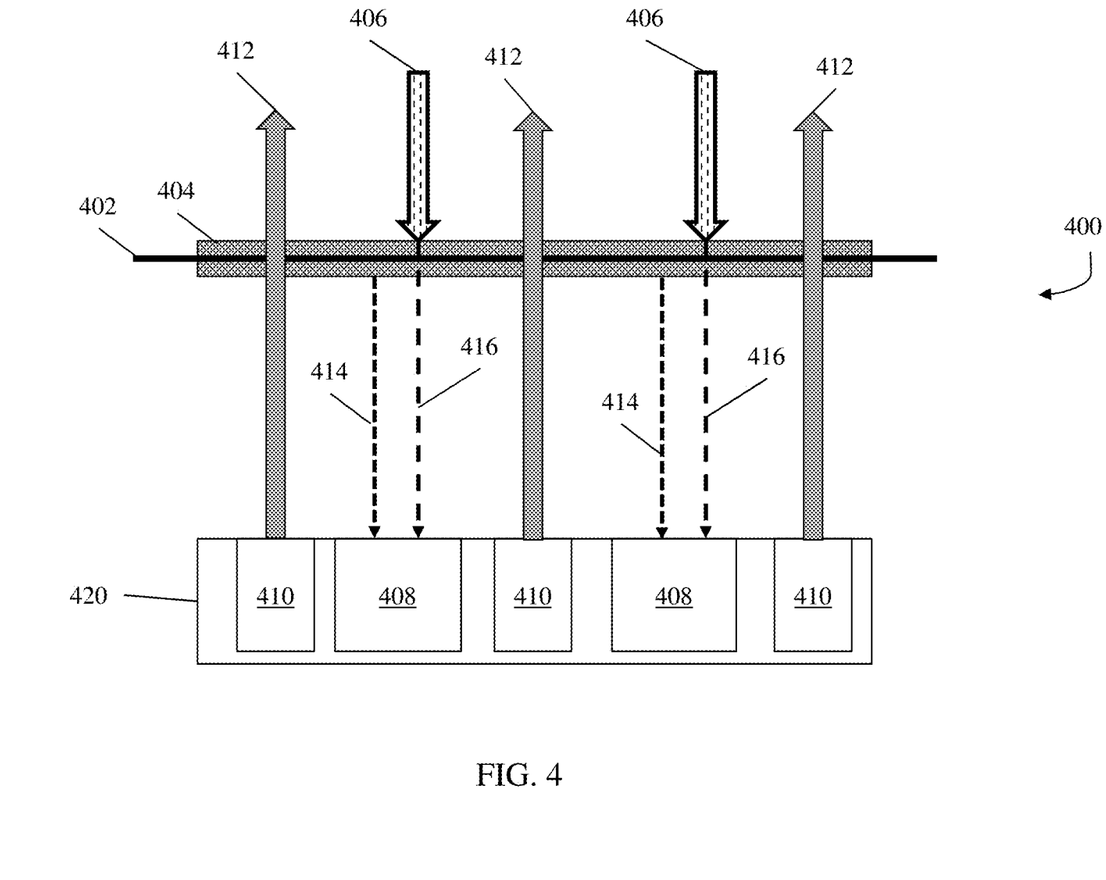
FIG. 4 depicts a block diagram of a side view of a system for data entry device security according to one or more embodiments of the present invention.

Turning now to a more detailed description of aspects of the present invention, FIG. 4 depicts a diagram of a side view of a system for data entry device security according to one or more embodiments of the invention. The system 400 includes a data entry device 402, a translucent material 404, one or more sensors 408, and one or more light emitters 410. The one or more sensors 408 and one or more light emitters 410 are located below the data entry device 402 and arrange to emit and/or collect light that passes through the translucent material 404.

Figure 5:
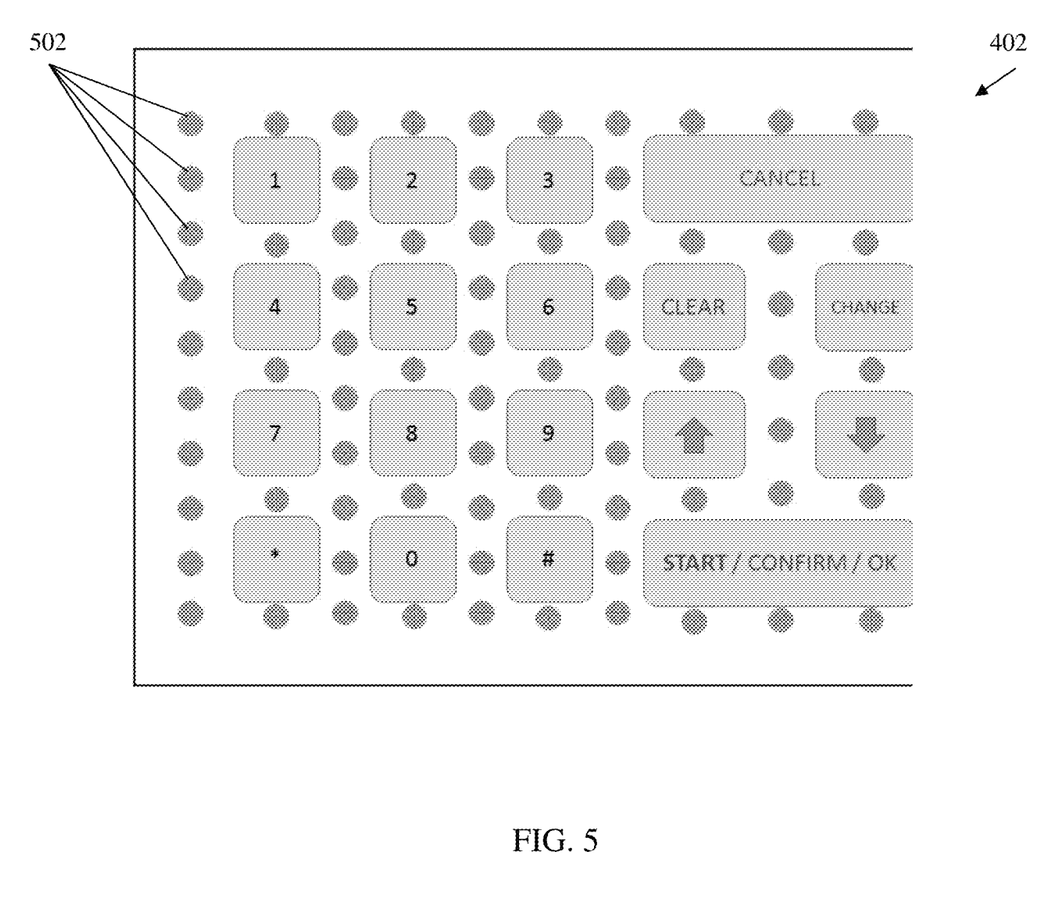
FIG. 5 depicts a top view of an illustrative example of a data entry device according to one or more embodiments of the present invention.

FIG. 5 depicts a top view of an illustrative example of a data entry device according to one or more embodiments of the present invention. The data entry device 402 has multiple apertures 502 and within the apertures 502 is the translucent material 404. The apertures 502 are arranged on the surface of the data entry device 402 so that light may pass through these apertures 502, the light can emanate from both above and below the surface of the data entry device 402. The translucent material 404 has a reflection coefficient and a transmission coefficient. The reflection coefficient is utilized to calculate an expected reflectance of any light emitted that reflects off translucent material 404. The transmission coefficient it utilized to calculate an expected transmittance of any light that passes through a medium (i.e., the translucent material 404).

Turning back to FIG. 4, the system 400 for data entry device security operates to determine whether a fraud device has been overlaid on top of the data entry device 402. An example data entry device 402 would be a keypad at an automated teller machine (ATM). A fraud device would be designed to avoid detection by a user of a keypad at the ATM. The system 400 utilizes security light 412 that is emitted from the one or more emitters 410 to determine if a fraud device has been overlaid on top of the data entry device 402. In FIG. 4, there is no fraud device shown and the data entry device is in a "good" state. In one or more embodiments of the invention, the system 400 will receive an indication that a user is present at the data entry device 402. For example, a user may hit a "start" or "begin" button. The system 400 determines if there is a fraud device overlaid on the date entry device by emitting a security light 412 from the emitters 410. The security light 412 passes through the translucent material 404 and also reflects back a reflected portion 414 of the security light which is collected by the sensors 408. The security light 412 has a luminous power that is known to the system 400. An expected measurable light reflection value for the security light 412 can be determined based on the characteristics of the security light 412 and at least the reflection coefficient of the translucent material 404. In one or more embodiments, a range for the expected measurable light reflection value can be determined based at least in part on the luminous power of the security light 412 and the reflection coefficient of the translucent material 404. The sensors 408 compare the collected reflected portion 414 to this range to determine if a fraud overlay device is present. If the reflected portion 414 luminous power is outside the expected range, the system 400 has detected a fraud overlay device is present. Luminous power (sometimes referred to as "luminous flux") is the measure of the perceived power of light. Luminous power is one example of a measurement of light. However, in one or more embodiments, any type of measurement for collection of light by sensors can be utilized such as, for example, luminous intensity, brightness, luminance, frequency of light, and the like. The sensors 408 can be any type of photodetector sensors such as, for example, photo-emissive cells, photo-conductive cells, photo-voltaic cells, photo-junction devices, and the like. The emitters 410 are not limited to emitting visible light and can be utilized to emit infrared and ultraviolet light with corresponding sensors operable to detect and measure the amount of infrared and/or ultraviolet light reflected by the translucent material 404.

In one or more embodiments, the system 400 also takes into consideration the ambient light around the data entry device 402. For example, an ATM kiosk can be located outdoors and be exposed to varying degrees of light during the day and night. As such, the system detects ambient light 406 which passes through the translucent material 404 and is collected by the one or more sensors 408. The collected ambient light 416 has a luminous power after passing through the one or more apertures 502 and the translucent material 404. The collected ambient light 416 can establish a baseline light for the sensors 408 when collecting the reflected portion 414 of the security light 412. The emitters 410 emit the security light 412 and a reflected portion 414 is collected by the sensors 408. The total luminous power can be determined based at least in part on the reflected portion 414 of the security light and the collected ambient light 416.

A luminous power range is established by the system 400 based at least in part on the collected ambient light 416 and an expected measurable light reflection value for the security light 412. The expected measurable light reflection value can be determined based on the characteristics of the security light 412 and at least the reflection coefficient of the translucent material 404. If the total luminous power is within the luminous power range, the data entry device 402 can proceed with normal operation with the user. However, if the total luminous power is outside the luminous power range, one or more security procedures can be implemented. The one or more security procedures can include actions such as, for example, locking/disabling the data entry device, an ATM card reader is disabled, displaying a warning message to the user via a display screen near the data entry device, an audio warning message can be transmitted to the user, an electronic message can be transmitted to a bank or financial institution alerting them of the potential fraud.

Figure 6:
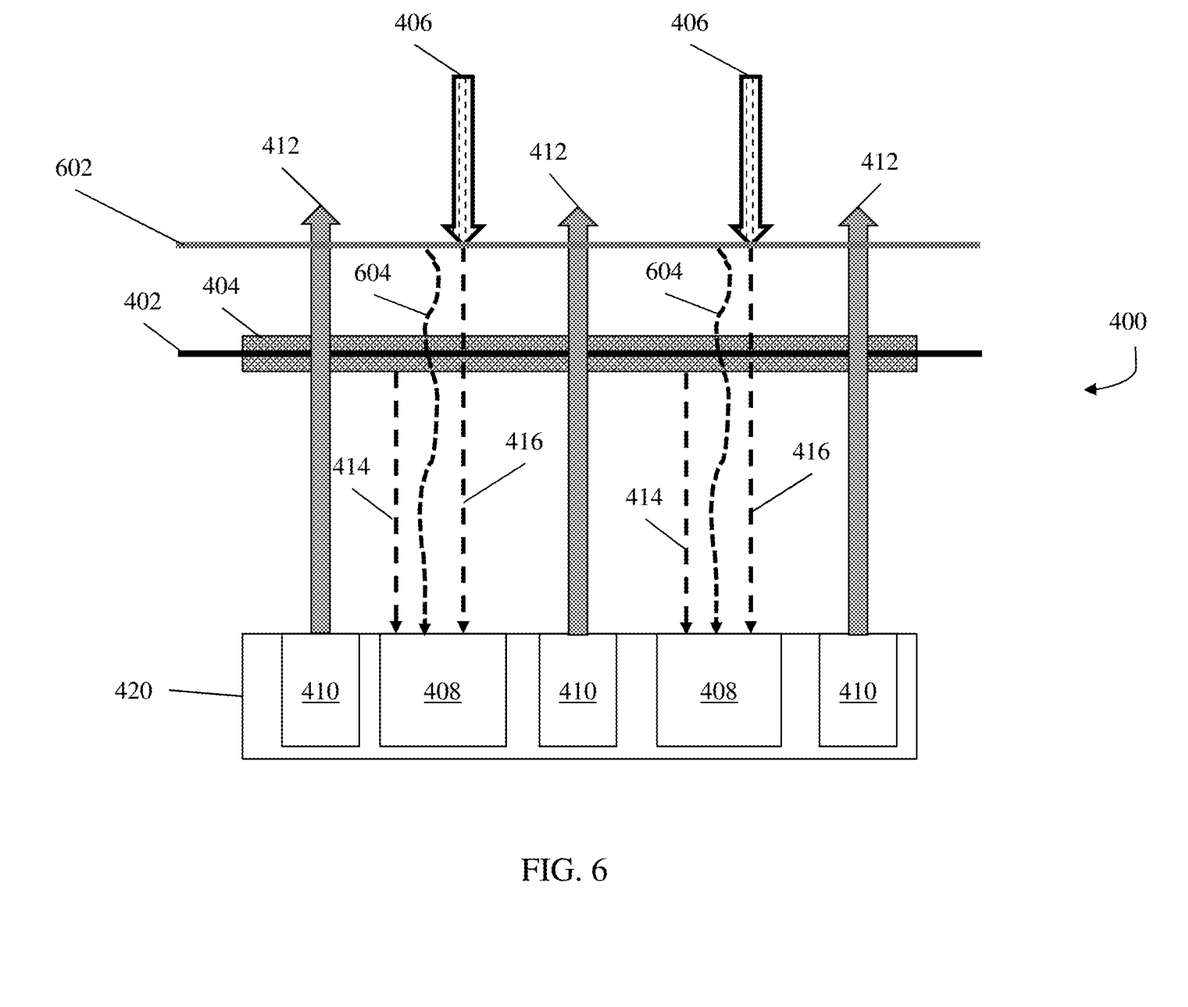
FIG. 6 depicts a diagram of the system when an exemplary fraud overlay is present on the data entry device according to one or more embodiments of the invention.

FIG. 6 depicts a diagram of the system when an exemplary fraud overlay is present on the data entry device according to one or more embodiments of the invention. The fraud overlay device 602 can be overlaid on top of the data entry device 402 by an unauthorized person. The system 400 detects this fraud overlay device 602 by emitting security light from the emitters 410. A reflected portion 414 is collected by the sensors 408. With the presence of the fraud overlay device 602, an additional reflected portion 604 is also collected by the sensors 408. As described above, the system 400 determines an expected measurable light reflection value. In one or more embodiments, a range for the expected measurable light reflection value is determined. This range can be created by the owner or operator of the keypad entry device 402 (e.g., ATM). The range can be based on a tolerance level developed and adjusted by either the owner/operator or through training of the system 400 utilizing machine learning algorithms or any other suitable algorithm. In one or more embodiments, as described above, the ambient light 406 can be considered by the system 400. The collected ambient light 416 can establish a baseline light for the sensors 408 when collecting the reflected portion 414 and the additional reflected portion 604 to determine a total luminous power. If this total luminous power is outside the expected range, then a fraud overlay device 602 may be present and security procedures can be implemented.

In one or more embodiments of the invention, the system 400 can allow one or more retries for the user to access the data entry device 402. For example, if a user accidentally blocks a particular aperture 502 on the data entry device 402, the system 400 can allow a retry so that the user can still operate the data entry device 402. The number and frequency of retries can be set by the owner/operator of the data entry device 402 or can be trained utilizing machine learning algorithms or any other type of suitable algorithm.

Figure 7:
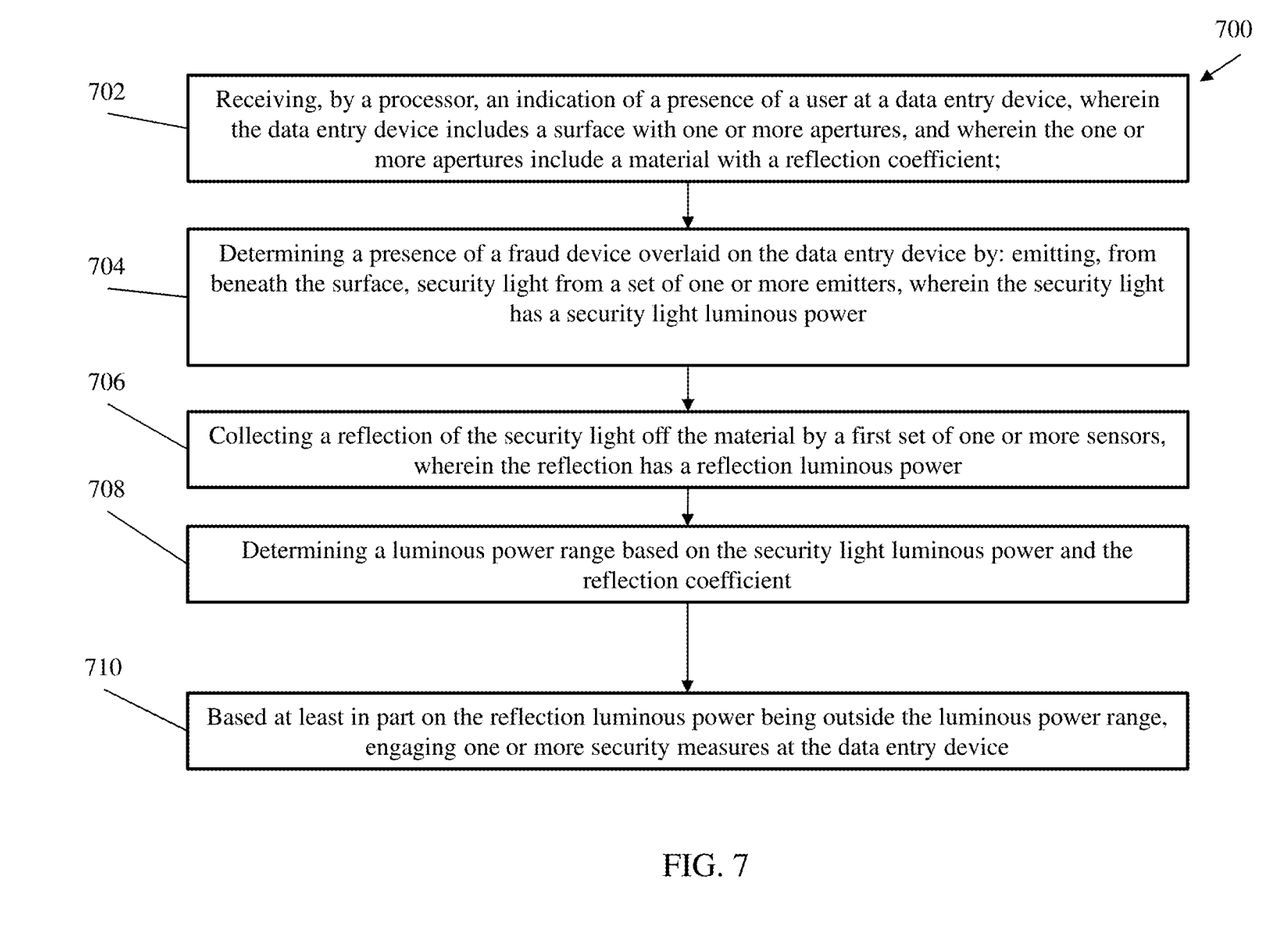
FIG. 7 depicts a flow diagram of a method for data entry security according to one or more embodiments of the invention.

FIG. 7 depicts a flow diagram of a method for data entry security according to one or more embodiments of the invention. The method 700 includes receiving, by a processor, an indication of a presence of a user at a data entry device. The data entry device includes a surface with one or more apertures, and a material within the apertures having a reflection coefficient, as shown at block 702. The method 700 includes determining a presence of a fraud device overlaid on the data entry device by emitting, from beneath the surface, security light from a set of one or more emitters, wherein the security light has a security light luminous power, as shown at block 704. The method 700 collects a reflection of the security light off the material by the first set of one or more sensors, as shown at block 706. The reflection has a reflection luminous power. The method 700 determines a luminous power range based on the security light luminous power and the reflection coefficient, as shown at block 708. At block 710, the method 700, based at least in part on the reflection luminous power being outside the luminous power range, engages one or more security measures at the data entry device.

Additional processes may also be included. It should be understood that the processes depicted in FIG. 7 represent illustrations, and that other processes may be added or existing processes may be removed, modified, or rearranged without departing from the scope and spirit of the present disclosure.

Figure 8:
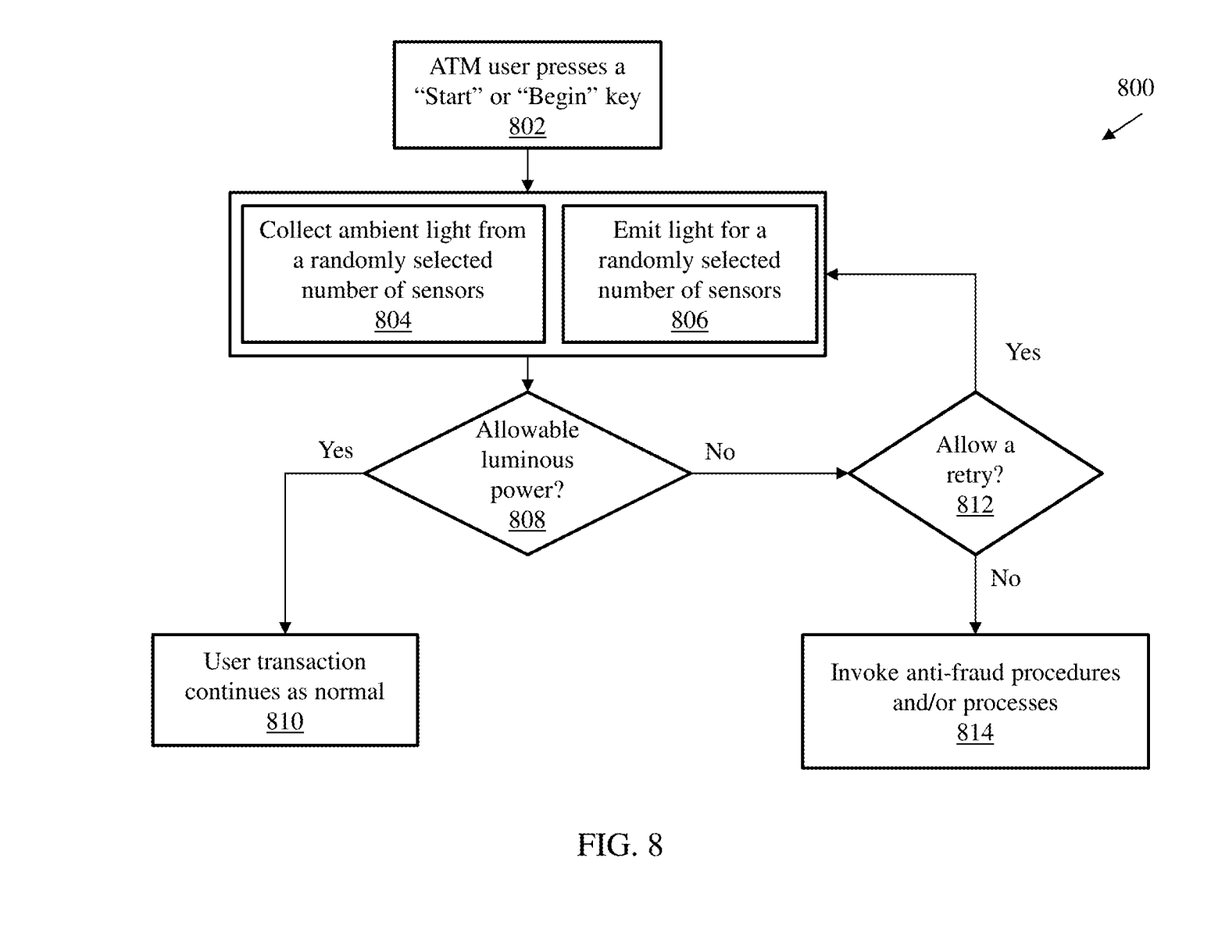
FIG. 8 depicts a flow diagram of a method for data entry security according to one or more embodiments of the invention.

FIG. 8 depicts a flow diagram of a method for data entry security according to one or more embodiments of the invention. The method 800 at 802 beings with an end user of an ATM pressing the "start" or "begin" key. In addition to pressing a button, any other suitable method for determining the presence of an end user at an ATM can be utilized. In one or more embodiments, ambient light is collected from a randomly selected number of sensors that are arranged under the data entry device 402. The number of sensors is randomly selected to increase the effectiveness of security. The system 400, as block 804, randomly selects a number that is greater than or equal to one but less than or equal to the total number of sensors around the keypad area, and collects the amount of ambient light received by the sensors represented by the random number (e.g., for 21 sensors, a random number of 7 will turn on a total of 7 sensors, the turning on is also done at random). The system 400, at block 806, randomly selects a number that is greater to or equal to one but less than or equal to the total number of emitters (sometimes referred to as sensors) around the keypad area and emit light. At block 808, the total number of sensors turned on will result in a measurable amount of ambient light and reflected light to be returned. The total amount of measured light, relative to the total number of sensors turned on is checked to see if the total measured light is expected/within an expected tolerance (i.e., range). If an allowable amount of reflected and ambient light is present, the method 800 moves to block 810 and the user transaction continues as normal. However, if an allowable luminous power is not present, the method 800 continues to block 812.

In one or more embodiments of the invention, the minimum (min) and the maximum (max) amount of ambient light that can be received by the sensors can be determined during a training period prior to activating the data entry device 402. The min and max ambient light values are stored in a storage communicatively coupled to the data entry device 402 and is used to determine if the ambient light combined with the reflected light detected is allowable/ tolerable. To determine the min and max ambient light baselines, the system 400 is trained to determine a reasonable min/max values for ambient light 416. Reasonable, in this context, can be determined by the owner/operator of the data entry device. Ambient light 416 is sampled without the emitting of a security light 412. When the ambient light 416 is sampled, the security light 412 is emitted and the total light captures is the ambient light 416 and the reflection of the security light 412. (Note, in some cases an additional reflected light 604 may be collected by the sensors 408). The following algorithm can be utilized at block 808, if the sample of ambient light 416 is less than the min or greater than the max, then the method 800 continues to block 812. Otherwise, a second sample is taken which includes the sensor light collected (i.e., 414, and, sometimes, 604). If the sensor light collected minus the ambient light 416, then go to block 810 for normal operation of the date entry device. Also, if the sensor light collected minus the ambient light 416 is within a range (i.e., the margin for error), then go to block 810. Otherwise, the method 800 goes to block 812. At block 812, the method 800 checks to see if a retry operation is available. If yes, the method 800 retries. If no, the method 800 continues to block 814 and invokes anti-fraud procedures and/or processes to protect an end-user from a potential overlay device.

Additional processes may also be included. It should be understood that the processes depicted in FIG. 8 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for data entry security, the method comprising:
   receiving, by a processor, an indication of a presence of a user at a data entry device, wherein the data entry device includes a surface with one or more apertures, and
   wherein the one or more apertures include a material with a reflection coefficient;
   determining a presence of a fraud device overlaid on the data entry device by:
      emitting, from beneath the surface, security light from a set of one or more emitters, wherein the security light has a security light luminous power;
      collecting a reflection of the security light off the material by a first set of one or more sensors, wherein the reflection has a reflection luminous power;
      determining a luminous power range based on the security light luminous power and the reflection coefficient; and
      based at least in part on the reflection luminous power being outside the luminous power range, engaging one or more security measures at the data entry device.

2. The method of claim 1, wherein the material includes a transmission coefficient and further comprising:
   collecting ambient light by a second set of one or more sensors, wherein the ambient light passes through one or more apertures of the data entry device;
   determining a total luminous power based at least in part on the ambient light and the reflection of the security light;
   deriving a second luminous power range based on the ambient light and the reflection luminosity; and
   based at least in part on the total luminosity being outside the second luminous power range, engaging one or more security measures at the data entry device.

3. The method of claim 1 further comprising: based at least in part on the reflection luminous power being within the luminous power range, allowing operation of the data entry device.

4. The method of claim 2 further comprising: based at least in part on the total luminous power being within the second luminous power range, allowing operation of the data entry device.

5. The method of claim 1, wherein the determining the luminous power range includes determining a reflectance based at least in part on the security light and the reflection coefficient of the material.

6. The method of claim 1, wherein the first set of one or more sensors is randomly selected.

7. The method of claim 2, wherein the second set of one or more sensors is randomly selected.

8. The method of claim 1, wherein the one or more security measures include repeating the determining of the fraud device overlaid on the data entry device.

9. The method of claim 2, wherein the one or more security measures include repeating the determining of the fraud device overlaid on the data entry device.

10. The method of claim 1, wherein the data entry device is associated with financial transactions.

* * * * *